United States Patent [19]

Hester

[11] Patent Number: 4,458,425
[45] Date of Patent: Jul. 10, 1984

[54] SURVEYOR'S ROD DEVICE

[76] Inventor: Thomas A. Hester, Rte. 1, Box 242, Shelby, Miss. 38774

[21] Appl. No.: 434,405

[22] Filed: Oct. 14, 1982

[51] Int. Cl.³ .............................................. G01C 15/06
[52] U.S. Cl. .......................................... 33/296; 33/161
[58] Field of Search ........................... 33/293, 296, 161

[56] References Cited

U.S. PATENT DOCUMENTS

| 1,735,953 | 11/1929 | Clausen et al. | 33/296 |
| 2,058,998 | 10/1936 | Kouzichkov | 33/296 |
| 3,190,008 | 6/1965 | Weiss | 33/161 |
| 3,250,010 | 5/1966 | Smith | 33/296 |
| 4,060,909 | 12/1977 | Collins et al. | 33/296 |
| 4,345,382 | 8/1982 | Warren | 33/296 |

Primary Examiner—Willis Little

Attorney, Agent, or Firm—Walker & McKenzie

[57] ABSTRACT

A surveyor's rod device which includes structure to permit the device to selectively be telescopically retracted into a stowable/portable configuration and extended into a utilization configuration. The device also includes handle structure particularly arranged for facilitating manually holding the device uprightly while being utilized in its extended configuration and for providing ease in carrying it about while in either of the configurations thereof. Also, included are numerous specific indicia characters which are proportionately applied to particular locations along the length of the rod for accommodating a more rapid observation and identification of certain predetermined incremental progressions appearing along the length of the device.

10 Claims, 15 Drawing Figures

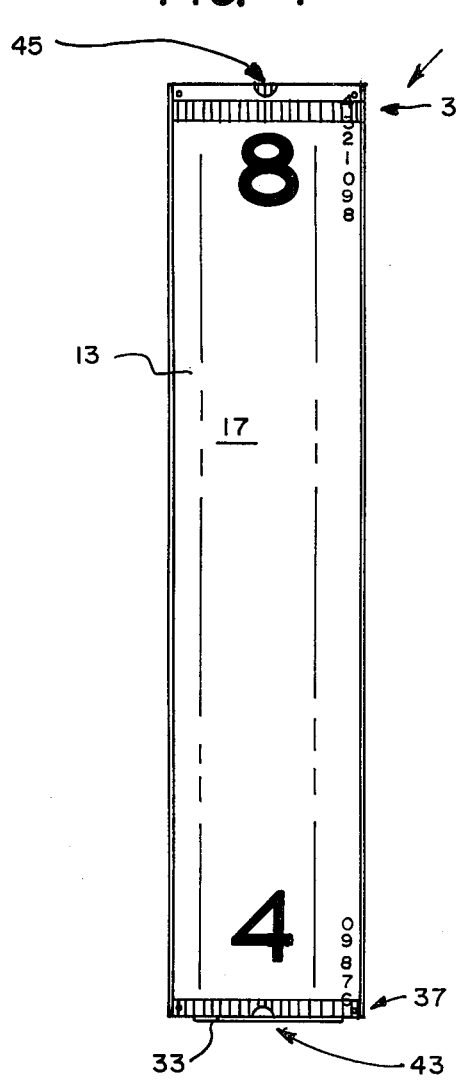
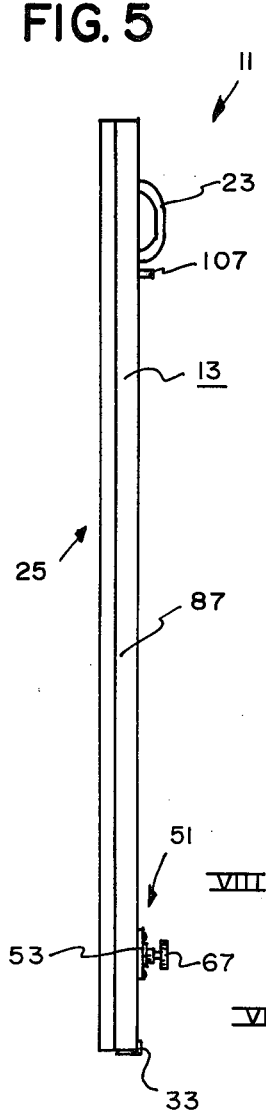
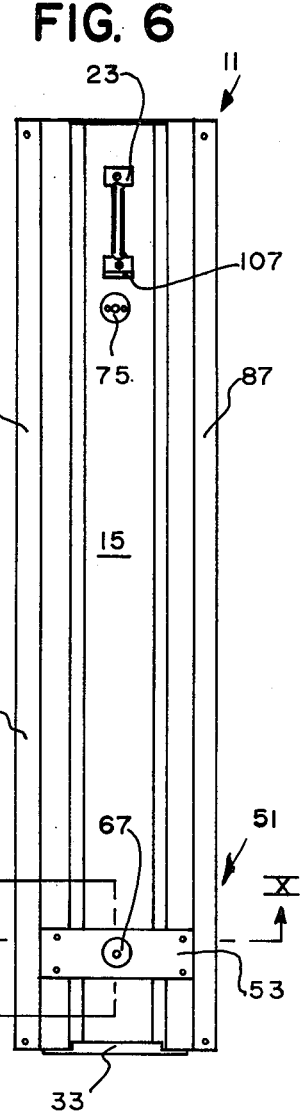
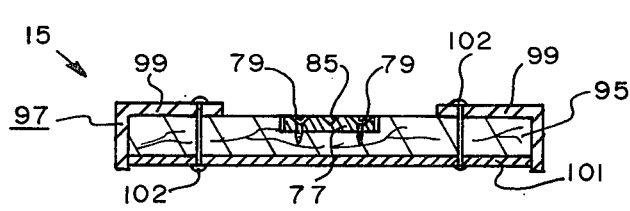
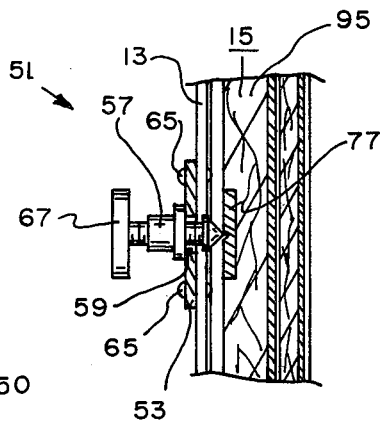
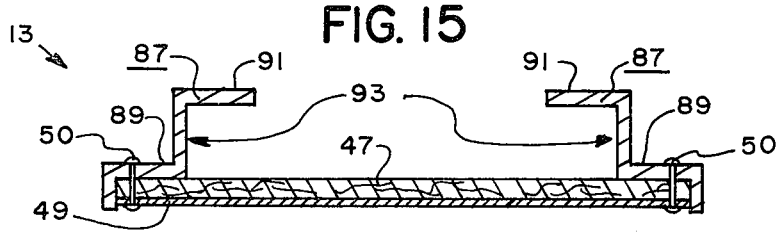

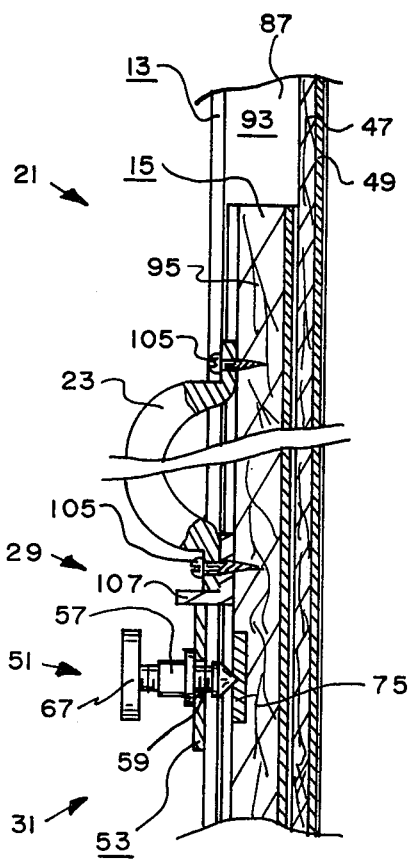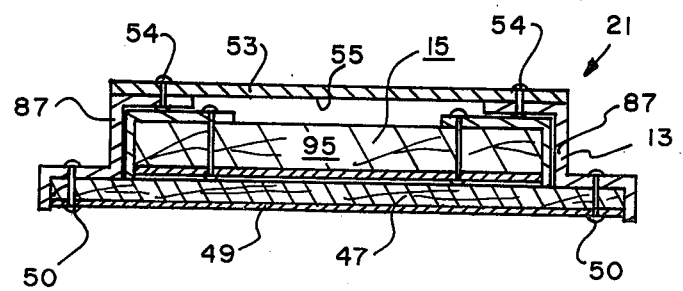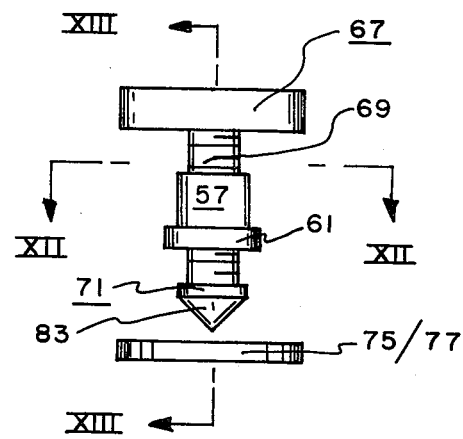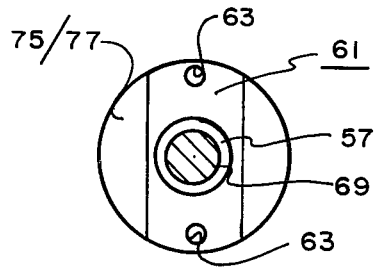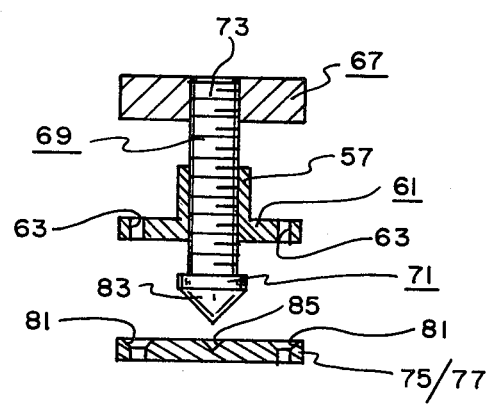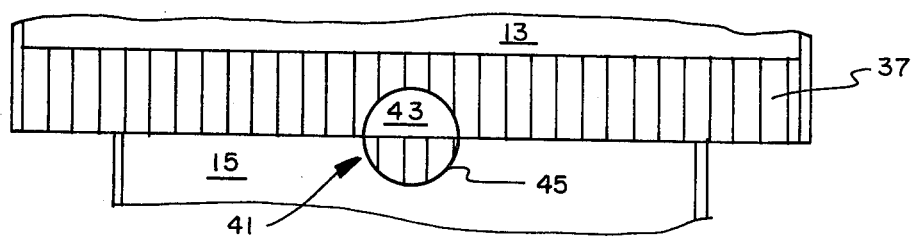

SURVEYOR'S ROD DEVICE

BACKGROUND OF THE INVENTION

1. Field of the Invention

This invention relates to the field of surveyor's equipment and is particularly directed toward surveyor's measuring rods.

2. Description of the Prior Art

Heretofore, a surveyor's measuring rod was simply constructed from an elongated piece of lumber, e.g., usually a nominal eight foot (2.4 meters) in length and approximately two inches by two inches (50.8 millimeters by 50.8 millimeters) in cross-section, thus enabling the workman to grasp the rod anywhere along the length thereof while either carrying the rod from one location to another while disposed horizontally or holding it in its upright utilization position. The typical rod, of course, has the usual measuring indicia applied thereto which the surveyor workman utilizes as he observes certain transit-compass instrument sightings thereof, i.e., during the course of accomplishing certain well-known surveyor tasks.

Several problems prevail with the above type surveyor's rod, among which are the following: First, the physical length of the rod inherently creates a problem in transporting the rod from one location to another, i.e., it would be most advantageous if the size of the rod could be reduced to enable it to be placed in the luggage compartment of modern day motor vehicles. Second, the small physical size cross-section of the rod dictates the physical size of the indicia appearing thereon. Thus, the indicia, by necessity, must be small, e.g., a nominal one inch (25.4 millimeters). Therefore, the surveyor workman is, often times, unable to read the indicia accurately at certain distances. This, of course, conceivably can result in an error of reading the indicia, i.e., on the part of the surveyor workman.

Third, since the typical surveyor's rod is not provided with a handle, the workman is required to grasp the rod with his hand while holding it ever so properly. This often times causes his hand or fingers to inadvertently obscure the particular indicia the surveyor is attempting to read. This problem also conceivably can result in errors being made by the surveyor.

Fourth, since the workman repeatedly grasps the rod at a convenient location along the length thereof when holding the rod in its upright utilization position, the indicia at this particular location eventually experiences excessive wear which makes it become illegible. This also conceivably can contribute to errors on the part of the surveyor.

Therefore, there exists a need for an improved surveyor's rod which obviates the above-mentioned problems. Accordingly, the present invention is directed toward that end.

SUMMARY OF THE INVENTION

The present invention is directed toward overcoming the problems and disadvantages of prior surveyor rods, particularly the four problems outlined above. Accordingly, one objective of the present invention is to provide a surveyor's measuring rod device which is retractable so that it may conveniently be placed in the luggage compartment of present day motor car vehicles.

Another objective of the present invention is to provide a surveyor's rod device which accommodates the application of large size indicia, e.g., the size of at least some of the numerals being approximately four inches (101.6 millimeters) high and three inches (76.2 millimeters) wide.

Another objective of the present invention is to provide a handle for facilitating manually holding the device while it is utilized uprightly, thus accomplishing the two-fold purpose of avoiding obscuring the indicia with the fingers of the workman and at the same time avoiding any wear of the indicia which offers the added advantage of prolonged legibility of all the indicia on the rod.

It will be appreciated that the above summary is couched in rather general language. Therefore, for a better understanding of this invention, a preferred embodiment thereof will be fully described by making explicit reference to the accompanying drawings, in which the various parts will progressivly be disclosed or indicated by numerals arranged in an ascending order.

DESCRIPTION OF THE DRAWINGS

FIG. 4 is a front elevational view of the device shown in the retracted stowable/portable configuration thereof.

FIG. 5 is a side elevational view of the device as shown in FIG. 4.

FIG. 6 is a rear elevational view of the device as shown in FIG. 4.

FIG. 7 is an enlarged sectional view taken as on the lines VII—VII of FIG. 3, although certain structure has been deleted for brevity.

FIG. 8 is an enlarged partial sectional view taken as on the line VIII—VIII of FIG. 6.

FIG. 9 is an enlarged partial sectional view taken as on the line IX—IX of FIG. 3.

FIG. 10 is an enlarged sectional view taken as on the line X—X of FIG. 6, although certain structure has been deleted for brevity.

FIG. 11 is an enlarged view of the lock structure shown in FIGS. 8 and 9 as it would appear when disassembled from the device.

FIG. 12 is a sectional view taken as on the line XII—XII of FIG. 11.

FIG. 13 is a sectional view taken as on the line XIII—XIII of FIG. 11.

FIG. 14 is an enlarged view of the portion of the device as circumscribed by the line XIV in FIG. 1.

FIG. 15 is an enlarged sectional view taken as on the line XV—XV of FIG. 3.

DESCRIPTION OF THE PREFERRED EMBODIMENT

Figure 1:
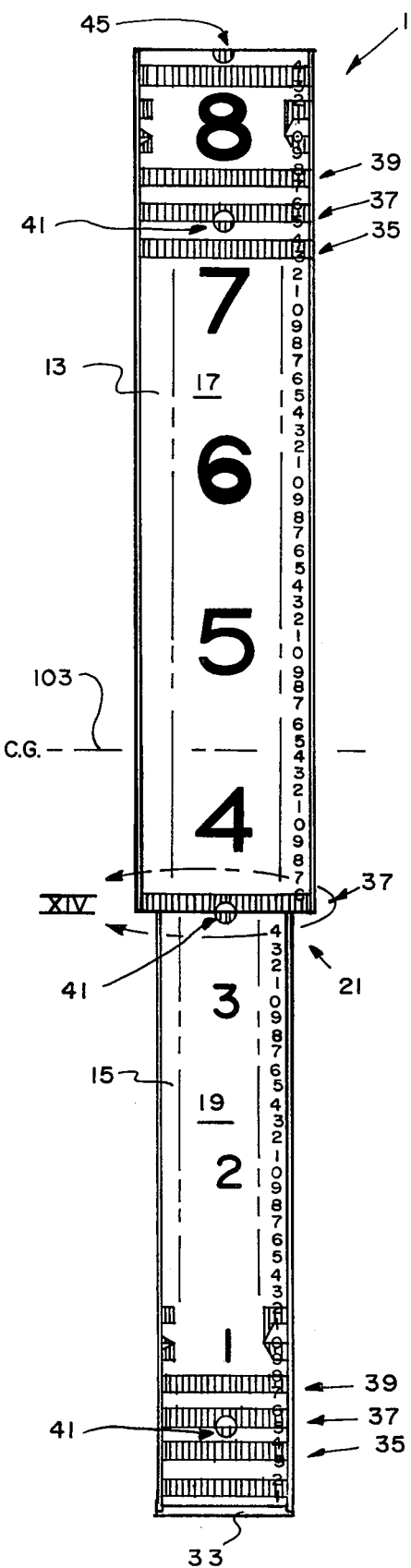
FIG. 1 is a front elevational view of the device shown in the extended utilization configuration thereof.
Figure 2:
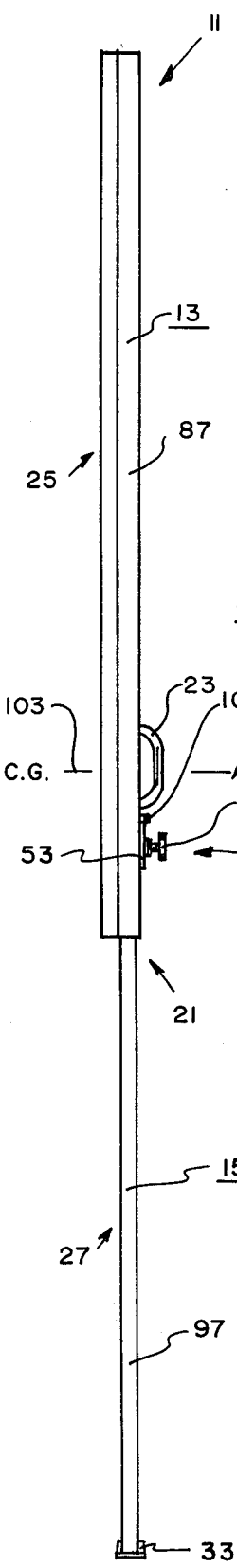
FIG. 2 is a side elevational view of the device shown in FIG. 1.
Figure 3:
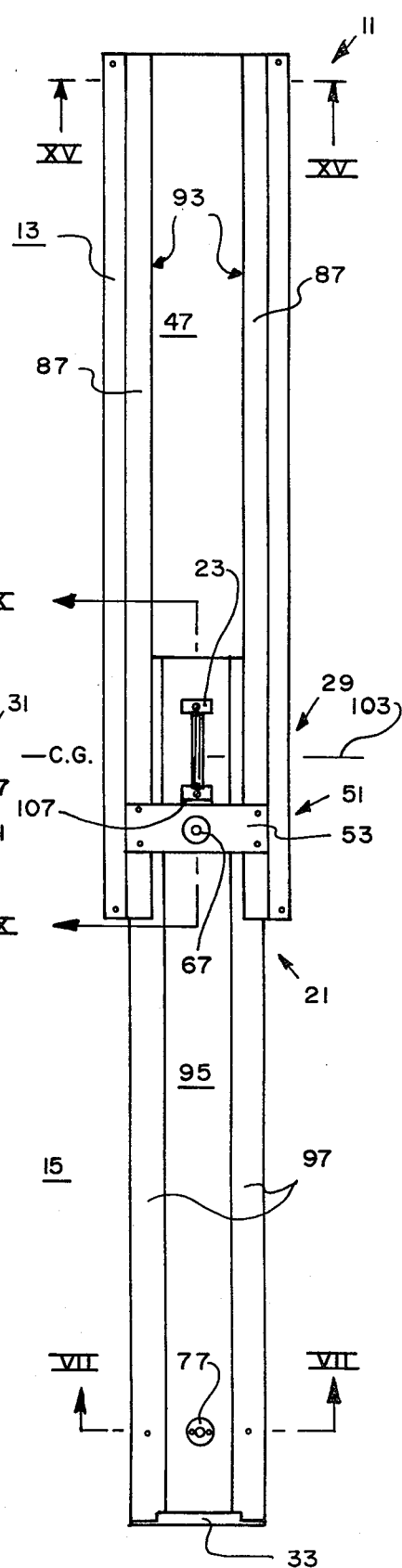
FIG. 3 is a rear elevational view of the device shown in FIG. 1.

The device 11 is an improved surveyor's rod of the type that is manually held in an upright disposition by a helper workman as he assists a surveyor workman as the latter is engaged in observing certain well-known transit/compass instrument sightings of the device 11 during the course of accomplishing certain well-known surveyor tasks. The device 11 includes a plurality of individual sections, e.g., in this embodiment the device 11 includes first and second sections 13, 15 respectively, having cooperative fragmental segments of surveyor indicia, as at 17, 19, applied thereto. It will be appreciated that an important feature of the present invention is that it includes telescopic means, generally indicated at 21, for telescopically joining the plurality of individual sections, 13, 15, one with another and for enabling the device 11 to be selectively telescopically operable between an extended utilization configuration as shown in FIGS. 1–3 of the drawings, and a retracted stowable/portable configuration as shown in FIGS. 4–6 of the drawings. The device 11 also includes handle means, as at 23, which is fixedly attached to one of the sections, e.g., preferably the second section 15, for facilitating manually holding the device 11 while being utilized uprightly in the extended utilization configuration thereof and for providing ease in carrying the device 11 about while in either of its configurations.

From FIGS. 1–6 of the drawings it may readily be seen that the first section 13 embodies an elongated broad planar configuration including a broad planar obverse side, as at 25. It should be mentioned that the fragmental segments of surveyor indicia 17, 19 alluded to above may optionally be referred to hereinafter as first and second fragmental segments of surveyor indicia respectively. Accordingly, the obverse side 25 of the first section 13 has the first segment of indicia 17 applied thereto.

Similarly, the second section 15 includes a broad planar obverse side, as at 27, which has the second fragmental segment of surveyor indicia 15 applied thereto.

FIGS. 4–6 of the drawings clearly show that when the device 11 is in the retracted stowable/portable configuration thereof the second section, 15, is substantially enveloped by the first section 13. On the other hand, FIGS. 1–3 and 1A of the drawings clearly show that the first and second fragmental segments of surveyor indicia 17, 19 are capable of being arranged for cooperative junction one with the other as the device is extended to the depicted extended utilization configuration thereof.

From FIGS. 3 and 9 of the drawings it may readily be seen that the device 11 preferably includes stop means, as at 29. The dual purpose of the stop means 29 is for limiting the telescopic extending action of the telescopic means 21 and for facilitating the establishment of an optimum junction (FIG. 14) of the fragmental segments of the surveyor indicia 17, 19 as the device 11 is telescopically operated to the extended utilization configuration thereof, as shown in FIGS. 1–3. Thus, the stop means 29 is caused to come into play, in a manner best shown in FIG. 9 of the drawings.

From FIGS. 1–6 of the drawings it may readily be seen that the device 11 includes restplate means, as at 33, which is attached to the lowermost end of the device 11 for restingly engaging the surface of the earth while the device 11 is being manually held in its upright disposition, i.e., in the extended utilization configuration as shown in FIGS. 1–3 of the drawings.

From FIGS. 1 and 4 of the drawings it may readily be seen that the second segment of indicia 19 which is applied to the second section 15 encompasses units of measure which includes the one foot mark, the two foot mark, the three foot mark, and the three and one-half foot mark as well as indicating the one-tenth foot intervals therebetween. In addition, the first segment of indicia 17 as applied to the first section 13 encompasses units of measure including the four foot mark, the five foot mark, the six foot mark, the seven foot mark, the eight foot mark, and the eight and one-half foot mark, as well as the one-tenth foot mark intervals therebetween.

It is significant to also note that the first and second segments of indicia 17, 19 include applying thereto a first, second and third bar, as at 35, 37, 39 respectively between each of the numerals 1–8. Of course, the first and second segments of indicia 17, 19 include other well-known features which have no bearing on the present invention. Accordingly, it should be sufficient to simply state that the indicia 17, 19 which embraces the first, second and third bars 35, 37, 39 respectively are arranged to assist the surveyor in readily recognizing not only the even one foot measuring marks but also the tenths of feet therebetween. Thus, the first bar, second bar and third bar, 35, 37, and 39 respectively have a definite width which precisely equals one-tenth of a foot. Therefore, the surveyor, heretofore, simply counted the bars between the large numerals to readily determine the particular tenths of feet being sighted. This system of counting the bars has an obvious disadvantage in that extreme care was necessary in avoiding errors.

Therefore, as shown in FIGS. 1 and 4 of the drawings, the present invention preferably includes a plurality of specific indicia means, as at 41. It should be observed that the means 41 are proportionately applied to particular locations, e.g., precisely mid-way between the full one foot marks, along each of the sections 13, 15. The function of the means 41 is to enable the surveyor workman to rapidly observe and identify with a high degree of accuracy, certain predetermined incremental progressions, i.e., the above-mentioned one-half foot intervals, appearing along the length of the device 11 during the course of accomplishing certain surveyor tasks. It should be understood that the device 11 as shown in FIGS. 1 and 4 does not show the repetition of indicia along the entire length thereof, i.e., sufficient indicia is being shown to adequately disclose the inventive concept.

Accordingly, at each one-half foot interval the second bar of indicia 37 will include the specific indicia means 41 which comprises an upper half circle, as at 43 and best shown in FIG. 14 of the drawings, and a lower half circle, as at 45.

It will be appreciated by those skilled in the art that the bars 35, 37, 39 as well as other typical indicia are suitably applied in a particular color, i.e., usually red. Therefore, the proper symbol for the color red has been shown in FIGS. 1, 4 and 14 of the drawings to depict the color red where appropriate. Moreover, it should be noted that the specific indicia means 41 includes showing the upper half circle 43 in the usual background; i.e., white; while the lower half circle 45 preferably will be applied using the color red as shown in FIGS. 1, 4 and 14 of the drawings. Moreover, the upper half circle 43 is applied so as to have a sharp contrast with the second bar of indicia 37 while the lower half circle 45 is applied so as to have an equally sharp contrast with the background which is usually white. Therefore, the surveyor workman may rapidly observe and identify the specific indicia means 41 appearing at the five tenths or one-half foot mark along the length of the device 11.

From FIGS. 9–10 and 15 of the drawings it may readily be seen that the elongated broad planar first section 13 includes a first section mainbody member, as at 47, which preferably is formed from plywood or the like and which coextends with the major axis of the first section 13. The mainbody member 47 has the first fragmental segment of surveyor indicia 17 applied to and constituting the obverse side thereof. In actual practice, the first segment of indicia 17 preferably would be applied to a sheet metal member, as at 49, which is suitably attached to the mainbody member 47 in any well-known manner as with rivets 50 or the like.

Particular attention will now be directed toward FIGS. 5-13 of the drawings wherein it may be seen that the device 11 includes lock means generally indicated at 51 for selectively locking and unlocking the telescopic means 21 while the device 11 is configured in either of the described configurations thereof.

The lock means 51 preferably comprises a transverse platelike member, as at 53 and best viewed in FIG. 10 of the drawings. The platelike member 53 is fixedly attached, as with rivets 54, to the reverse side of the first section 13, at a particular location along the length thereof (which will be more significant as this specification proceeds) and at a spaced distance from the reverse side of the first section mainbody member 47. Thus, the platelike member 53 defines, at least in part, a passageway, as at 55, through which the second section 15 may freely pass when changing from one of the configurations of the device 11 to the other one thereof.

The lock means 51 also includes internally threaded sleeve means, as at 57 and best viewed in FIGS. 11-13 of the drawings. The sleeve means 57 is adapted for compatible alignment with an aperture, as at 59 in FIG. 9, which is suitably provided in the transverse platelike member 53. The sleeve means 57 includes a flange member, as at 61, which is provided with a pair of apertures, as at 63, for conveniently fixedly attaching the sleeve means 57 to the platelike member 53 in any well-known manner, as with rivets 65 or the like, as clearly shown in FIG. 8 of the drawings.

The lock means 51 also includes thumbscrew means, as at 67 and best shown in FIG. 13 of the drawings. The means 67 is suitably fitted with an externally threaded shaft, as at 69, for threadedly engaging the internally threaded sleeve means 57 and for selectively engaging and disengaging the section 15. More specifically, the shaft 69 may be urged to impinge against the reverse side of the second section 15 by running the thumbscrew means 67 through the transverse platelike member 53, thus locking the telescopic means 21. Conversely, disengaging the thumbscrew means 67 from the second section 15 is achieved by substantially retracting the thumbscrew means 67 from the transverse platelike member 53, thus the telescopic means 21 may be unlocked.

It will be appreciated by those skilled in the art that the externally threaded shaft member 69 preferably is captured to the sleeve means 57. In this embodiment, this is achieved by providing the externally threaded shaft member 69 with an enlarged terminus, as at 71, thus merely the opposite end of the shaft 69, as at 73 in FIG. 13, may be inserted through the sleeve means 57 prior to receiving the thumbscrew means 67. Ideally, the thumbscrew means 67 is ultimately fixedly attached to the shaft member 69 in any well-known manner as by welding or the like, i.e., subsequent to the shaft 69 having been received in the sleeve means 57.

From FIGS. 3, 6-9 and 11-13 of the drawings it may be seen that the lock means 31 includes first and second disc members, as 75, 77, which are fixedly attached to the reverse side of the second section 15 in any well-known manner as with screws 79 in FIG. 7, i.e., each of the disc members 75, 77 is provided with a pair of apertures, as at 81 in FIG. 13, for receiving the screws 79.

The disc members 75, 77 are positioned at precise locations, i.e., on the reverse side of the second section 15, which have coincidence with the two configurations of the device 11 for cooperating with the thumbscrew means 67 by establishing a passive unrelenting surface upon which the thumbscrew means 67 may impingingly engage as the lock means 31 is operated, i.e., in the above described fashion.

Moreover, the enlarged terminus 71, i.e., of the externally threaded shaft 69, terminates at a sharp point, as at 83 in FIG. 13. In addition, each of the first and second disc members 75, 77 is provided with a conical-shaped indentation, as at 85 in FIG. 13, for matable engagement with the sharp terminus 83, thus greatly enhancing the effectiveness of the lock means 31.

Particular attention will now be directed toward FIGS. 10 and 15 of the drawings wherein it may be seen that the telescopic means 21 includes a pair of confrontingly arranged spaced-apart bi-stepped multi-angle support members, as at 87. More specifically, each of the members 87 defines a first step, as at 89, and a second step, as at 91. The support members 87 coextend with the major axis of the first section mainbody member 47 and are fixedly attached to the remote marginal portions thereof in any well-known manner as with the previously mentioned rivets 50 or the like, as at 93 in FIG. 13, for slidably receiving the second section 15 therein, in a manner best shown in FIG. 10 of the drawings.

From FIGS. 3 and 7-10 of the drawings it may readily be seen that the second section 15 includes a second section mainbody member, as at 95, which coextends with the major axis of the second section 15. The mainbody member 95 has the second fragmental segment of surveyor indicia 19 applied to and constituting the obverse side thereof.

The telescopic means 21 includes encasement means, as at 97, FIG. 7, for encasing, at least in part, the second section mainbody member 95 and for imparting an ease in the telescopic operation between the extended utilization configuration and the retracted stowable/portable configuration of the device 11. The encasement means 97 preferably includes a pair of confrontingly arranged angle members, as at 99 in FIG. 17, and a sheet metal member, as at 101, i.e., the second segment of indicia 19 preferably is applied to the sheet metal member 101 in any well-known manner as by simply being painted thereon. Likewise, the first segment of indicia 17 is preferably painted on the sheet metal member 49.

The encasement means 97 includes means, e.g., rivets 102 or the like in FIG. 7, for permanently joining the angle members 99 and the sheet metal member 101 to the mainbody member 95.

From FIGS. 1-3 of the drawings it may be seen that the center of gravity, (C.G.) of the device 11, characterized by a broken line 103, i.e., when in the extended utilization configuration thereof, passes substantially through the median plane of the handle means 23. Therefore, the handle means especially provides ease in carrying the device 11 about while in the extended utilization configuration thereof, i.e., the device 11 is conveniently balanced when supported horizontally in this configuration.

The handle means 23 preferably is attached to the second section 15 in any conventional fashion, e.g., a pair of screws 105 or the like, as shown in FIG. 9.

The stop means 29 alluded to previously includes an arresting member, as at 107 and best shown in FIG. 9 of the drawings, which is fixedly attached to the mainbody member 95 in any well-known manner, as with one of the previously mentioned screws 105 or the like. The arresting member 107 is arranged so as to abuttingly engage the transverse platelike member 53 when the second section 15 has been extended to the position shown in FIGS. 1-3 of the drawings, or in the extended utilization configuration of the device 11.

From the above disclosure it may readily be seen that the device 11 may easily be retracted into the stowable/portable configuration by simply loosening the thumbscrew means 67 and sliding the second section 15 telescopically into the first section 13, i.e., by the telescopic means 21. In this configuration the lock means 31 may be employed for locking the telescopic means 21 in the manner disclosed above. Conversely, the device 11 may be extended into the utilization configuration thereof by simply loosening the thumbscrew means 67 and extending the second section 15 outwardly from the first section 13. The lock means 31 may again be utilized in locking the telescopic means 21 so that the device 11 remains in this configuration while being utilized or carried about.

Although the invention has been described and illustrated with respect to a preferred embodiment thereof, it is not intended to be so limited since changes and modifications may be made therein which are within the full intended scope of the invention.

I claim:

1. An improvement in a surveyor's rod device of the type that is manually held in an upright disposition by a helper workman thus assisting a surveyor workman as the latter is engaged in observing certain transit-compass instrument sightings of the device during the course of accomplishing certain surveyor tasks; wherein the improvement comprises a plurality of individual sections having cooperative fragmental segments of surveyor indicia applied thereto, telescopic means for telescopically joining said plurality of individual sections one with another and for enabling said device to be selectively telescopically operable between an extended utilization configuration and a retracted stowable/portable configuration; handle means fixedly attached to one of said sections for facilitating manually holding said device while being utilized uprightly in the extended utilization configuration thereof and for providing ease in carrying said device about while in either of said configuration thereof; and a plurality of specific indicia means proportionately applied to particular locations along each of said sections for enabling the surveyor workman to rapidly observe and identify certain predetermined incremental progressions appearing along the length of said device during the course of accomplishing certain surveyor tasks, said specific indicia means including a plurality of dot indicia members proportionately applied to particular locations along each of said sections, each of said dot indicia members comprising an upper half circle indicium and a lower half circle indicium, said upper and lower half circle indicia being colored so as to sharply contrast with one another.

2. An improvement in a surveyor's rod device of the type that is manually held in in upright disposition by a helper workman thus assisting a surveyor workman as the latter is engaged in observing certain transit-compass instrument sightings of the device during the course of accomplishing certain surveyor tasks; wherein the improvement comprises an elongated broad planar first section including a broad planar obverse side having a first fragmental segment of surveyor indicia applied thereto; an elongated broad planar second section including a broad planar obverse side having a second fragmental segment of surveyor indicia applied thereto, telescopic means for telescopically joining said first and second sections one with another and for enabling said device to be selectively telescopically operable between an extended utilization configuration and a retracted stowable/portable configuration wherein said second section is substantially enveloped by said first section, said first and second fragmental segments of surveyor indicia capable of being arranged for cooperative junction one with the other as said device is extended to the extended utilization configuration thereof, handle means fixedly attached to a reverse side of the second section for facilitating manually holding said device while being utilized uprightly in the utilization configuration thereof and for providing ease in carrying said device about while configured in either of said configuration thereof; and a plurality of specific indicia means proportionately applied to particular locations along each of said sections for enabling the surveyor workman to rapidly observe and identify certain predetermined incremental progressions appearing along the length of said device during the course of accomplishing certain surveyor tasks, said specific indicia means including a plurality of dot indicia members proportionately applied to particular locations along each of said sections, each of said dot indicia members comprising an upper half circle indicium and a lower half circle indicium, said upper and lower half circle indicia being colored so as to sharply contrast with one another.

3. The device as set forth in claims 1 or 2 in which is included stop means for limiting the telescopic extending action of said telescopic means and for facilitating the establishment of an optimum junction of said fragmental segments of the surveyor indicia as said device is extended to the extended utilization configuration thereof and thereby causing said stop means to come into play.

4. The device as set forth in claims 1 or 2 in which is included lock means for selectively locking and unlocking said telescopic means while said device is configured in either of said configurations thereof.

5. The device as set forth in claims 1 or 2 in which is included rest plate means attached to the lowermost end of said device for restingly engaging the surface of the earth while said device is being manually held in the upright disposition thereof.

6. The device as set forth in claim 2 in which said elongated broad planar first section includes a first section mainbody member co-extending with the major axis of the first section and having said first fragmental segment of surveyor indicia applied to and constituting the obverse side thereof, and in which is included lock means for selectively locking and unlocking said telescopic means while said device is configured in either of said configurations thereof; said lock means comprising a transverse platelike member fixedly attached to the reverse side of the first section, at a particular location along the length thereof, and at a spaced distance from the reverse side of said first section mainbody member, thus defining, at least in part, a passageway through which the second section may freely pass when changing from one of said configurations of said device to the other one thereof; internally threaded sleeve means adapted for compatible alignment with an aperture provided in said transverse platelike member and being fixedly attached thereto; and thumbscrew means, having an externally threaded shaft, for threadedly engaging said internally threaded sleeve means and for selectively impinging against the reverse side of said second section by running said thumbscrew means through said transverse platelike member, thus locking said telescopic means - and disengaging said thumbscrew means from said second section by substantially retracting said thumbscrew means from said transverse platelike member, thus unlocking said telescopic means.

7. An improvement in a surveyor's rod device of the type that is manually held in an upright disposition by a helper workman thus assisting a surveyor workman as the latter is engaged in observing certain transit-compass instrument sightings of the device during the course of accomplishing certain surveyor tasks; wherein the improvement comprises an elongated broad planar first section including a broad planar obverse side having a first fragmental segment of surveyor indicia applied thereto; an elongated broad planar second section including a broad planar obverse side having a second fragmental segment of surveyor indicia applied thereto; telescopic means for telescopically joining said first and second sections one with another and for enabling said device to be selectively telescopically operable between an extended utilization configuration and a retracted stowable/portable configuration wherein said second section is substantially enveloped by said first section, said first and second fragmental segments of surveyor indicia capable of being arranged for cooperative junction one with the other as said device is extended to the utilization configuration thereof; handle means fixedly attached to a reverse side of the second section for facilitating manually holding said device while being utilized uprightly in the utilization configuration thereof and for providing ease in carrying said device about while configured in either of said configuration thereof; said elongated broad planar first section including a first section mainbody member co-extending with the major axis of the first section and having said first fragmental segment of surveyor indicia applied to and constituting the obverse side thereof; and lock means for selectively locking and unlocking said telescopic means while said device is configured in either of said configurations thereof; said lock means comprising a transverse platelike member fixedly attached to the reverse side of the first section, at a particular location along the length thereof, and at a spaced distance from the reverse side of said first section mainbody member, thus defining, at least in part, a passageway through which the second section may freely pass when changing from one of said configurations of said device to the other one thereof; internally threaded sleeve means adapted for compatible alignment with an aperture provided in said transverse platelike member and being fixedly attached thereto; and thumbscrew means, having an externally threaded shaft, for threadedly engaging said internally threaded sleeve means and for selectively impinging against the reverse side of said second section by running said thumbscrew means through said transverse platelike member, thus locking said telescopic means - and disengaging said thumbscrew means from said second section by substantially retracting said thumbscrew means from said transverse platelike member, thus unlocking said telescopic means; said lock means including first and second disc members fixedly attached to the reverse side of the second section and being positioned respectively at precise locations which have coincidence with the two configurations of said device for cooperating with said thumbscrew means by establishing a passive unrelenting surface upon which said thumbscrew means may impingingly engage as said lock means is operated.

8. The device as set forth in claim 7 in which said externally threaded shaft terminates at a sharp point, and in which each of said first and second disc members is provided with a conical-shaped indentation for matable engagement with the sharp terminus of said externally threaded shaft, thus enhancing the effectiveness of said lock means.

9. An improvement in a surveyor's rod device of the type that is manually held in an upright disposition by a helper workman thus assisting a surveyor workman as the latter is engaged in observing certain transit-compass instrument sightings of the device during the course of accomplishing certain surveyor tasks; wherein the improvement comprises an elongated broad planar first section including a broad planar obverse side having a first fragmental segment of surveyor indicia applied thereto; an elongated broad planar second section including a broad planar obverse side having a second fragmental segment of surveyor indicia applied thereto; telescopic means for telescopically joining said first and second sections one with another and for enabling said device to be selectively telescopically operable between an extended utilization configuration and a retracted stowable/portable configuration wherein said second section is substantially enveloped by said first section, said first and second fragmental segments of surveyor indicia capable of being arranged for cooperative junction one with the other as said device is extended to the extended utilization configuration thereof; and handle means fixedly attached to a reverse side of the second section for facilitating manually holding said device while being utilized uprightly in the utilization configuration thereof and for providing ease in carrying said device about while configured in either of said configuration thereof; said elongated broad planar first section including a first section mainbody member co-extending with the major axis of the first section and having said first fragmental segment of surveyor indicia applied to and constituting the obverse side thereof, said telescopic means including a pair of confrontingly arranged spaced-apart bi-stepped multiangle support members co-extending with the major axis of said first section mainbody member and being fixedly attached to remote marginal portions thereof so as to establish, at least in part, an elongated channel for slidably receiving said elongated broad planar second section therein.

10. The device as set forth in claim 9 in which said elongated broad planar second section includes a second section mainbody member co-extending with the major axis of the second section and having said second fragmental segment of surveyor indicia applied to and constituting the obverse side thereof, and in which said telescopic means includes encasement means for encasing, at least in part, said second section mainbody member and for imparting an ease in the telescopic operation between the extended utilization configuration and the retracted stowable/portable configuration of said device.

* * * * *